Patented Nov. 19, 1929

1,736,642

UNITED STATES PATENT OFFICE

GEORGE P. BEAUDRY, OF MONTREAL, QUEBEC, CANADA

METAL-VAPOR LAMP

No Drawing.  Application filed March 25, 1922.  Serial No. 546,878.

The present invention relates to electric lamps of the vapor arc type, in which an arc is maintained in an evacuated tube containing the vapor of a metal, and has for its object to produce especial improvements in the casing or receptacle whereby alkali metals can be used as the essential or chief constituent of the liquid electrode.

Heretofore mercury vapor lamps have been employed to some extent for lighting. In these lamps the envelope or receptacle, usually in the form of a tube, has been made of either fused silica or a glass consisting essentially of silicates or mixtures of silicates with silica. Some attempts have been made to improve the mercury vapor lamp by employing in the mercury a small amount of an alkali metal for the purpose of making the light emitted more nearly white, because the greenish light produced by the mercury vapor is objectionable to many people. The use of alkali metals, however, has not given entire success, in spite of the many proposals heretofore made to employ alkali metals as constituents of the electrode.

The chief reason why such electrodes cannot be successfully used is that the alkali metals have a chemical action, at the high temperatures employed, on glass or silica, whereby a part of the silica reacts with alkali metals, forming silicates and silicon. Such products are opaque and hence prevent light from passing through the walls of the tube.

In accordance with the present invention, I have found that alkali metals can readily be used in the electrode, and in fact can be used as the sole constituent of the electrode if desired, provided that instead of employing a glass composed essentially of silica or silicates, a glass is employed which is composed essentially of alumina, boric anhydrid, or aluminates or borates, or mixtures of these materials, the said materials being not reacted upon by the alkali metals under ordinary working conditions of a vapor lamp.

When it is desired to use such materials for the production of the lamp casing, the said materials are melted and in a molten condition are formed in the tubes in substantially the same manner as glass tubes or quartz tubes are formed and the shape of the tube may be the ordinary shapes heretofore employed in making the glass or quartz tubes for mercury vapor lamps. An ordinary cylindrical tube of considerable length, having a bulb at one end, is for many purposes an entirely satisfactory shape. It is of course understood that the electrical connections lead from the outside into the interior of the tubes in the manner well known in this art.

It is ordinarily preferable to employ alloys of the alkali metals with each other, which are liquid at ordinary temperatures, for example, an alloy of 5 parts sodium and 1 part potassium by weight, gives good results. In this case the lamp is started by tilting the tube to first make a complete circuit between the two or more electrical connections, then slowly tilting the tube backward so that the bulk of the metal or alloy will work over into the bulb, after which the lamp may be continuously operated for any desired length of time.

The following examples of typical compositions of which the tube may be composed are given for the purpose of illustration:

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Alumina | 50% | 50% | 50% | 50% |  |  |  |  |  |  | 25% |  |  | 25% |
| Boric anhydrid | 50% |  |  |  |  |  |  |  |  |  |  |  |  |  |
| Sodium aluminate |  | 50% |  | 25% | 50% |  | 25% | 33% | 25% | 33% | 25% | 40% | 50% |  |
| Sodium borate |  |  | 50% | 25% |  | 50% | 25% | 33% |  | 34% | 25% | 20% |  |  |
| Calcium aluminate |  |  |  |  | 50% | 50% | 20% |  | 25% | 33% |  | 40% |  |  |
| Calcium borate |  |  |  |  |  |  |  | 34% | 25% |  |  |  |  |  |
| Aluminum borate |  |  |  |  |  |  |  |  | 25% |  |  | 25% |  |  |
| Melting point° C | 1200 | 1800 | 1100 |  |  |  |  | 900 |  |  |  | 1200 | 50% | 75% |

In No. 7, the components listed amount to 70%. The remaining 30% can be composed of any of the other components given in the table.

Of these compositions No. 8 has been found to be especially useful, this having a low melting point and producing a glass substitute which is sufficiently hard and strong to give very satisfactory results.

It is to be understood that while I have above referred to the use of alloys consisting wholly of alkali metals, it is sometimes advisable to employ therewith a small amount, for example, 5 to 10%, of mercury, in order that the light produced may have a certain greenish cast, or in order to overcome any undesired redness of the light produced.

In the modified construction, a compound glass tube may be employed, composed of an outer casing of hard glass or silica with a lining of one or another of the aluminate-borate compositions above referred to.

In making the glass it sometimes is advisable also to add a small amount, say 2% or 5%, of silica to the batch from which the glass tubes are to be made. Some of the glasses or glass substitutes are in this manner strengthened and made tougher and less brittle by such addition. Such an addition, furthermore, does not produce to any undesired extent, the formation of free silicon during use.

Various alloys of sodium, potassium, lithium, rubidium, and caesium can be employed, and I prefer to use those which are liquid at ordinary temperature or those which melt at relatively low temperatures. As above stated, a small amount of mercury may also be added to the alkali metal, or mixture of alkali metals, used, which in many cases increases the fluidity of the alloy.

With the metals employed, it is possible to operate the metal vapor lamps at a relatively low internal temperature, say between 200 and 400° C.

I have particularly referred above in the manufacture of the glass substitute, to the use of sodium and calcium borates and aluminates. It is possible in some cases to substitute barium or magnesium or strontium in place of a part of the calcium, and it is also possible to substitute potassium or other alkali metal or lead in place of part of the sodium.

I claim:

A metal vapor lamp casing comprising a receptacle formed of transparent material consisting essentially of sodium aluminate, sodium borate and calcium borate, in substantially equal amounts.

In testimony whereof I affix my signature.

GEORGE P. BEAUDRY.